United States Patent [19]

Tomono et al.

[11] Patent Number: 5,356,693
[45] Date of Patent: Oct. 18, 1994

[54] OFFSET BLANKET HAVING DEFINED PRINTING SURFACE CHARACTERISTICS

[75] Inventors: Seiji Tomono, Nishinomiya; Yasuhiko Kondo; Tetsuya Fuchikami, both of Akashi; Hisao Kagano, Takarazuka, all of Japan

[73] Assignee: Sumitomo Rubber Industries, Ltd., Kobe, Japan

[21] Appl. No.: 992,223

[22] Filed: Dec. 17, 1992

[30] Foreign Application Priority Data

Dec. 27, 1991 [JP] Japan .................................. 3-360498

[51] Int. Cl.$^5$ ............................................... B32B 3/10
[52] U.S. Cl. ...................................... 428/141; 428/909; 101/401; 101/492

[58] Field of Search .............. 428/141, 909; 101/401, 101/492

[56] References Cited

U.S. PATENT DOCUMENTS 3,819,471  6/1974  Sohnemann .......................... 161/162

Primary Examiner—George F. Lesmes
Assistant Examiner—Chris Raimund
Attorney, Agent, or Firm—Nikaido, Marmelstein, Murray & Oram

[57] ABSTRACT

The present invention provides an offset blanket for printing having a supporting layer and a surface printing layer laminated on the supporting layer. The surface printing layer has a surface configuration in which the mean peak distance is controlled so that good paper discharging properties can be maintained.

3 Claims, 5 Drawing Sheets

OFFSET BLANKET HAVING DEFINED PRINTING SURFACE CHARACTERISTICS

BACKGROUND OF THE INVENTION

The present invention relates to a printing offset blanket, and more particularly to improvements in an offset blanket for improving the same in paper discharging properties and other printing aptitudes.

As a printing method of obtaining prints of high quality, there is conventionally widely used an offset printing method.

According to the offset printing method, there are disposed a printing cylinder for carrying ink and an offset blanket coming in rotation-contact with the printing cylinder, thereby ink supplied from the printing cylinder to the offset blanket is transferred to a print carrier such as paper or the like, thus obtaining prints.

In the offset blanket printing method, the offset blanket is required to have such printing aptitudes as high paper discharging properties, good reproduciable dot shape, excellent ink applicability to a solid printing portion and the like.

If the offset blanket is particularly poor in paper discharging properties among the printing aptitudes above, this presents problems when printing operations are carried out at a high speed or on a smooth print carrier such as coated paper: adhesion acts between the print carrier and the offset blanket, which causes trouble in that the print carrier is curled or torn; bad influence such as slurs, overlaps, misregister or the like, which causes bad yield of prints.

In this connection, it has been attempted to coarsen the surface of the offset blanket in order to improve the offset blanket in paper discharging properties.

However, it often occurs that even products of the same offset blanket having the same surface roughness (which is defined in the Japanese Industrial Standards B 0601 established in 1952 and revised in 1982 and which refers to the arithmetical average of roughnesses of portions randomly extracted from the surface of a subject) are greatly different in paper discharging properties from one another. Further, the dot shape or the ink applicability to a solid printing portion generally requires fine surface roughness, so that the coarsening of the surface for the purpose of improving the paper discharging properties cannot improve the paper discharging properties so much, but causes decay of other printing aptitudes such as dot shape, ink applicability to a solid printing portion and the like.

In other words, it is difficult to obtain the surface configuration having the desired printing aptitudes by merely coarsening the surface.

In view of the defects above, the present invention is proposed with the object of providing an offset blanket having excellent paper discharging properties.

It is another object of the present invention to provide an offset blanket capable of reconciling high paper discharging properties with good dot shape and ink applicability to a solid printing portion.

SUMMARY OF THE INVENTION

The present invention reconciles effectively the paper discharging properties with other printing aptitudes by employing a novel parameter in a surface configuration of a surface printing layer in order to obtain the optimum surface. An offset blanket of the present invention comprises a supporting layer and a surface printing layer laminated on the supporting layer, wherein the surface configuration of the surface printing layer is formed such that a mean peak height Sm represented by the following equation is set in the range from about 25 $\mu$m to about 70 $\mu$m.

$$S_m = \frac{S_1 + S_2 + \ldots + S_n}{n}$$

In the equation, each of $S_1, S_2, \ldots S_n$ refers to the distance between a point where a section curve of the surface printing layer crosses an average line in a direction from one peak to a corresponding valley present in a measurement length and a point where the section curve crosses the average line in a direction from the next peaks to a corresponding valley: and n refers to the number of mountains present in the measurement length.

The measurement length refers to the length of a portion having a predetermined length extracted from the section curve. The section curve is defined in the Japanese Industrial Standards B 0601 established in 1952 and revised in 1982, and refers to an outline which appears in a cross-section of a subject with respect to a plane perpendicular to the surface to be measured.

The average line is defined in the Japanese Industrial Standards B 0601, and refers to a straight or curved line which has the geometrical configuration of a surface to be measured in a portion extracted from the section curve, and which is set such that the sum of square of deviations from the straight or curved line to the section curve is minimized.

The peak of the section curve is defined in the Japanese Industrial Standards B 0601, and refers to a peaked portion of the section curve which outlines the substance between two adjacent points at which the section curve intersects the average line when the average line is cut through the section curve.

Valley of the section curve is defined in the Japanese Industrial Standards B 0601, and refers to a depressed portion of the section curve which outlines the substance between two adjacent points at which the section curve intersects the average line when the average line cut through the section curve.

The offset blanket having the arrangement above can be improved in paper discharging properties regardless of whether the surface roughness is coarse or fine. It is therefore possible to improve other printing aptitudes than the paper discharging properties, yet making the surface roughness fine.

Preferably, the supporting layer has a compressive layer.

Preferably, the surface printing layer has a surface configuration in which a 10-point mean roughness Rz represented by the following equation is set in the range from about 4 $\mu$m to about 10 $\mu$m.

$$R_z = \frac{1}{5}\left(\sum_{i=1}^{5} P_i - \sum_{i=1}^{5} V_i\right)$$

In the equation, Pi refers to the heights of the peaks from the highest one to the fifth highest one as measured in the depth magnification from the average line in a portion having a basic length extracted from the section curve; and Vi refers to the depths of the valley bottoms from the deepest one to the fifth highest one as measured from the average line.

The 10-point mean roughness Rz is defined in the Japanese Industrial Standards B 0601, and the section curve and the average line are also defined in the Japanese Industrial Standards B 0601.

The basic length refers to the length of a portion having a predetermined length extracted from the section curve.

The peaks refer to the highest points in the section curve.

The valley bottoms refer to the lowest points of valleys in the section curve.

When the 10-point mean roughness Rz is set in the range above, the offset blanket can be improved in other printing aptitudes as to dot shape, ink applicability to a solid printing portion and the like than paper discharging properties.

BRIEF DESCRIPTION OF THE DRAWINGS

These and other features, objects and advantages of the present invention will be more fully apparent from the following detailed description set forth below when taken in conjunction with the accompanying drawings and wherein.

EMBODIMENTS

The following description will discuss in detail a preferred embodiment of the present invention with reference to the accompanying drawings.

Figure 1:
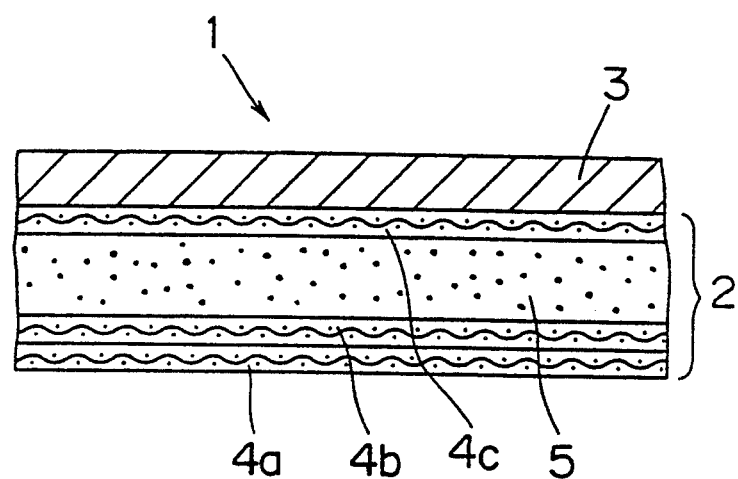
FIG. 1 is a section view of an offset blanket according to an embodiment of the present invention.

Referring to FIG. 1 which is a section view of an offset blanket according to an embodiment of the present invention, an offset blanket 1 comprises a supporting layer 2, a surface printing layer 3 disposed on the surface of the supporting layer 2, and a primer layer (not shown) interposed between the supporting layer 2 and the surface printing layer 3 for sticking the layers 2, 3 to each other.

The supporting layer 2 is formed by laminating a plurality of base cloths 4a, 4b, 4c (only three layers of cloth are shown in FIG. 1), which are impregnated with a rubber composition (rubber paste), and at least one compressive layer 5 which is disposed as necessary.

Each of the base cloths 4a, 4b, 4c is a woven fabric of cotton, polyester, rayon or the like. Examples of the rubber composition to be impregnated include acrylonitrile-butadiene copolymer rubber, chloroprene rubber and the like. These materials contain predetermined amounts of a vulcanizing agent, a vulcanization accelerator and a thickening agent as necessary. A woven fabric is coated with the rubber composition above by suitable coating means such as a blade coating method or the like.

The compressive layer 5 is formed by applying a rubber paste, in which a water-soluble powder such as salt is dissolved, to at least one of base cloths forming the intermediate layer; drying; and vulcanizing after the application, immersing the base cloth in hot water of 60° C. to 100° C. for 6 to 10 hours in order to let the water-soluble powder flow out; and drying.

The surface printing layer 3 is formed from a sheet layer which is formed, atop the primer layer, on the surface of the supporting layer 2 formed in the manner above. The sheet layer may be suitably formed by a method of applying and drying a surface-printing-layer forming rubber paste comprising a specific rubber composition, or a calender method or the like.

The laminated body of the sheet layer 3 and the supporting layer 2 is heatingly pressed and vulcanized at a predetermined pressure and a predetermined temperature to form the offset blanket 1.

The offset blanket 1 thus obtained is used by being attached to the peripheral surface of a transferring cylinder directly or through a lining.

In the arrangement above, the surface printing layer 3 of the offset blanket 1 of this embodiment will be able to have a special surface configuration by employing a novel parameter. This will be discussed in detail in the following.

In the surface printing layer 3 of the offset blanket 1 of this embodiment, a mean peak distance Sm ($\mu$m) represented by the following equation (1) is set in the range from about 25 $\mu$m to about 70 $\mu$m.

$$S_m = \frac{S_1 + S_2 + \ldots + S_n}{n} \qquad (1)$$

Figure 2:
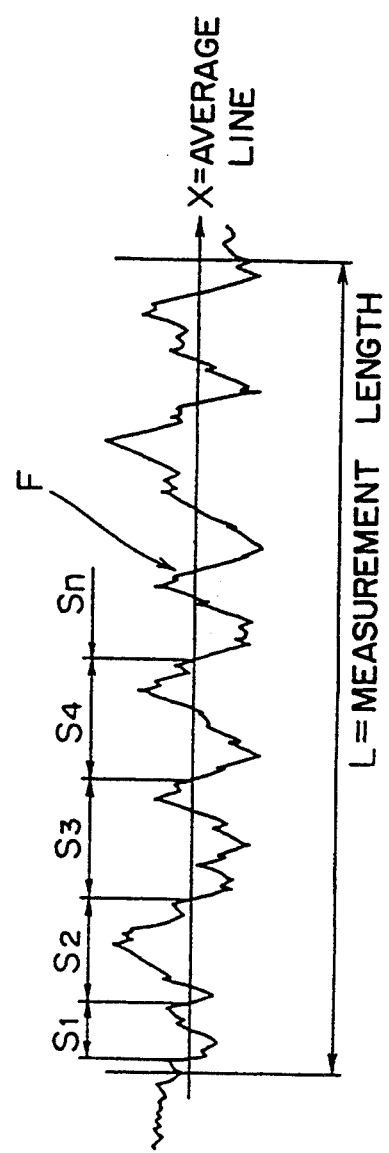
FIG. 2 is a view illustrating a method of calculating a mean peak interval.

In the equation (1), each of $S_1, S_2, \ldots S_n$ refers to the distance between a point where a section curve F shown in FIG. 2 crosses an average line X in a direction from one peak to a corresponding valley present in a measurement length L and a point where the section curve F crosses the average line X in a direction from the next peak to a corresponding valley; and n refers to the number of mountains present in the measurement length L.

The measurement length L refers to the length of a portion having a predetermined length extracted from the section curve. The section curve is defined in the Japanese Industrial Standards B 0601 established in 1952 and revised in 1982, and refers to an outline which appears in a cross-section of a subject with respect to a plane perpenducular to the surface to be measured, as shown in FIG. 2.

The average line X is defined in the Japanese Industrial Standards B 0601, and refers to a straight or curved line which has the geometrical configuration of a surface to be measured in a portion extracted from the section curve in FIG. 2, and which is set such that the sum of square of deviations from the straight or curved line to the section curve is minimized.

Peak P1(, P2, P3 . . . ) of the section curve is defined in the Japanese Industrial Standards B 0601, and refers to a peaked portion of the section curve which outlines the substance between two adjacent points at which the section curve intersects the average line X when the average line X cut through the section curve.

Valley V1(, V2, V3 . . . ) of the section curve is defined in the Japanese Industrial Standards B 0601, and refers to an indented portion of the section curve which outlines the substance between two adjacent points at which the section curve intersects the average line X when the average line X cut through the section curve.

As will be apparent in specific examples to be discussed later, the offset blanket 1 having the arrangement above can be improved in paper discharging properties regardless of the surface roughness which can be coarse or fine. It is therefore possible to improve other printing aptitudes than the paper discharging properties, while making the surface roughness fine.

In the surface printing layer 3 of the offset blanket 1 of this embodiment, a 10-point mean roughness Rz (μm) represented by the following equation (2), is set in the range from about 4 μm to about 10 μm.

$$R_z = \frac{1}{5} \left( \sum_{i=1}^{5} P_i - \sum_{i=1}^{5} V_i \right) \quad (2)$$

Figure 3:
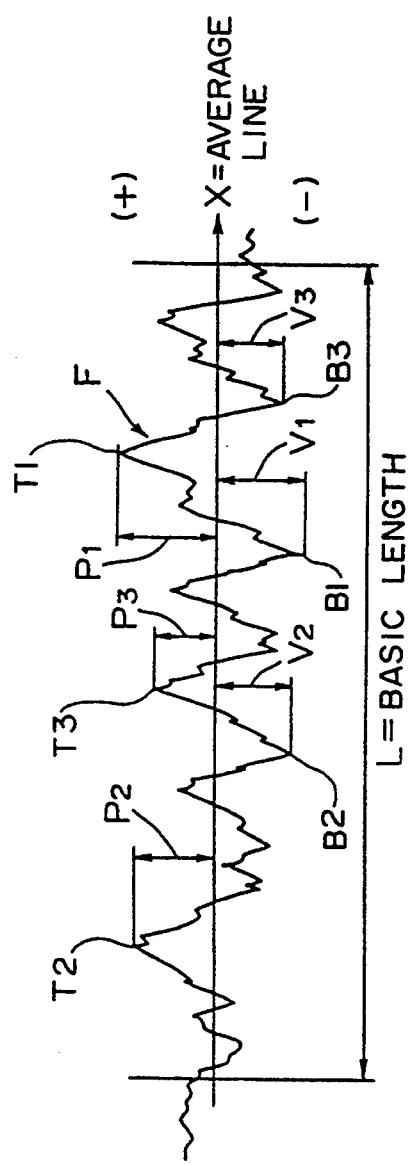
FIG. 3 is a view illustrating a method of calculating a 10-point mean roughness.

In the equation (2), Pi refers to the heights of the peaks from the highest one to the fifth highest one as measured in the depth magnification from the average line X in a portion having a basic length L extracted from the section curve F shown in FIG. 3; and Vi refers to the depths of the valley bottoms from the deepest one to the fifth deepest one as measured from the average line X.

The 10-point mean roughness Rz is defined in the Japanese Industrial Standards B 0601, and the section curve and the average line X are also defined in the Japanese Industrial Standards B 0601.

The basic length L refers to the length of a portion having a predetermined length extracted from the section curve shown in FIG. 3.

The peaks refer to the points of peaks having the greatest heights in the section curve (or the points designated by T1, T2, T3 . . . in FIG. 3).

The valley bottoms refer to the points of valleys having the greatest depths in the section curve (or the points designated by B1, B2, B3 . . . in FIG. 3).

In the Japanese Industrial Standards, the basic length L is represented in mm, and there are available, in principle, six lengths of 0.08 mm, 0.25 mm, 0.8 mm, 2.5 mm, 8 mm and 25 mm.

Table 1 shows the standard values of basic length L used for obtaining the 10-point mean roughness Rz.

TABLE 1

| Range of 10-Point Mean Roughness | | Basic Length L |
|---|---|---|
| greater than | not greater than | (mm) |
| — | 0.8 μmRz | 0.25 |
| 0.8 μmRz | 6.3 μmRz | 0.8 |
| 6.3 μmRz | 25 μmRz | 2.5 |
| 25 μmRz | 100 μmRz | 8 |
| 100 μmRz | 400 μmRz | 25 |

In this embodiment, since the 10-point mean roughness Rz is also set in a predetermined range, the offset blanket 1 can also be improved in other printing aptitudes such as dot shape, ink applicability to a solid printing portion and the like other than paper discharging properties.

In finishing the surface printing layer 3 of the offset blanket 1, there are available two methods: surface polishing and not polishing. When the surface is not to be polished, the surface configuration of the printing layer 3 is finished by applying a release agent such as talc or the like to the surface of the printing layer 3 which is not yet vulcanized, and by vulcanizing the printing layer 3 with vulcanizing paper attached thereto. In this connection, the finishing of the surface configuration is controlled by the shape, grain size, and amount of the release agent which is applied, and by the roughness of the vulcanizing paper. On the other hand, when the surface of the surface printing layer 3 is to be polished, the finishing of the surface configuration is mainly controlled by the roughness, grinding speed and grinding amount of a polishing grindstone, by the tension of the blanket at the time of polishing, and the like.

TEST RESULTS

With a variety of polishing conditions respectively applied to offset blankets identical with one another, there were prepared offset blankets different in their surface configuration of the supporting layer 2 as shown in Table 2. In Table 2, Rz refers to 10-point mean roughness, and Sm refers to a mean peak distance. With the use of a roughness meter of a needle-contact type (a surface configuration analyzing device, Model SAS-2010, manufactured by Meishin Kohki Co., Ltd.), the 10-point mean roughness Rz and the mean mountain distance Sm were measured under the conditions of measurement pitch of 1 μm and measurement length of 2.5 mm.

TABLE 2

|  | Sm | Rz |
|---|---|---|
| Comparative Example 1 (Conventional Product A) | 23.3 | 4.2 |
| Comparative Example 2 | 19.7 | 3.8 |
| Example 1 | 25.0 | 4.0 |
| Example 2 | 30.1 | 4.1 |
| Example 3 | 35.2 | 4.5 |
| Example 4 | 43.3 | 7.6 |
| Example 5 | 70.0 | 10.0 |
| Comparative Example 3 | 57.9 | 10.1 |
| Comparative Example 4 | 102 | 19.0 |

Figure 4:
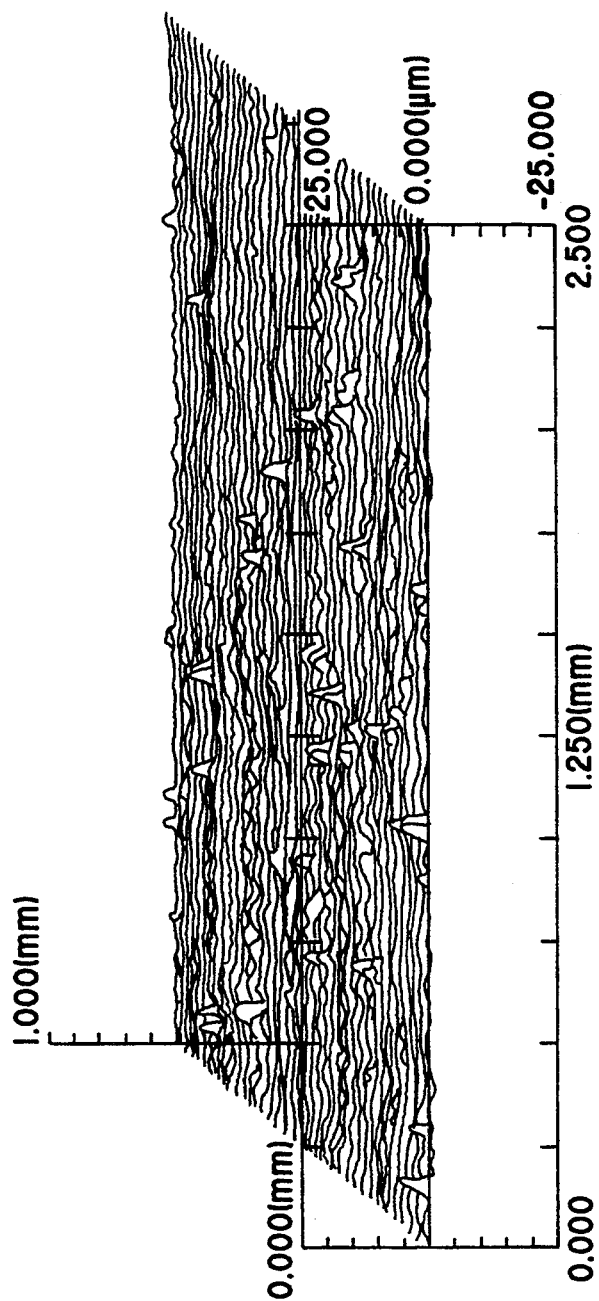
FIG. 4 is a graphic output illustrating the results of measurement of the three-dimensional surface configuration of a conventional offset blanket.
Figure 5:
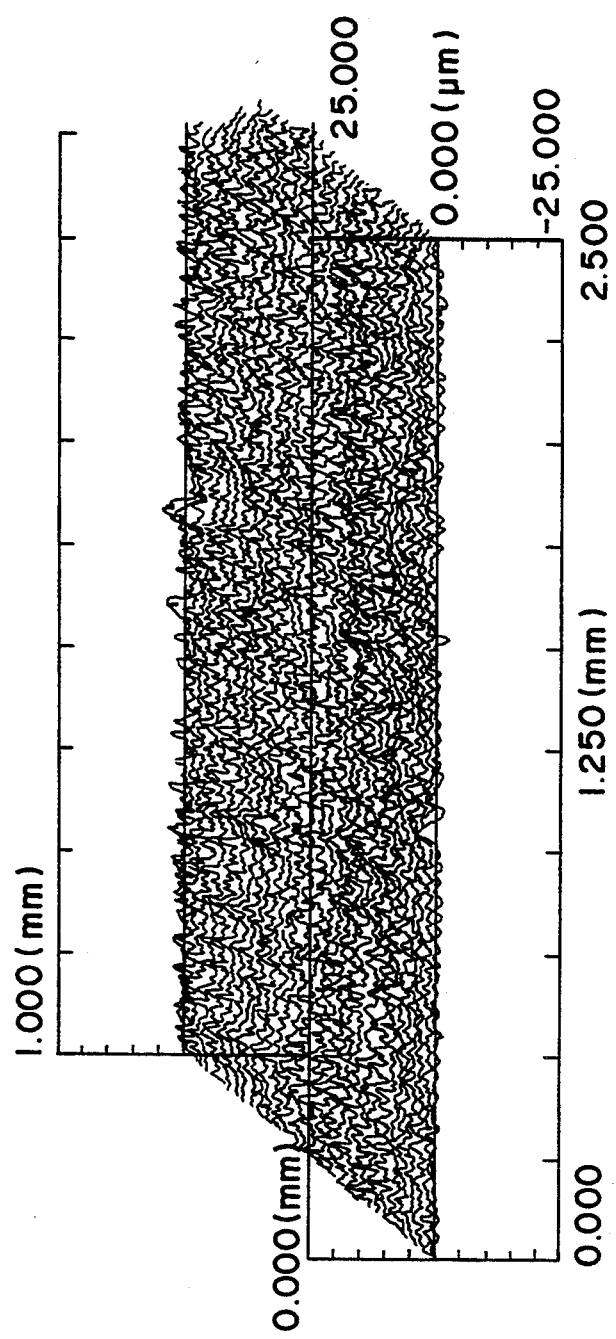
FIG. 5 is a graphic output illustrating the results of measurement of the three-dimensional surface configuration of the offset blanket according to the embodiment in FIG. 1.

Referring to FIGS. 4 and 5, the conventional product A is apparently different in three-dimensional surface configuration from Example 3. More specifically, the conventional product A is studded with high peaks, so that the mean peak distance Sm is small, as shown in FIG. 4. In Example 3, the mean peak distance Sm is set great, so that the peaks are made uniform in shape and continuously arranged, as shown in FIG. 5.

Printing was actually carried out with the use of the blankets of Examples 1 to 5 and Comparative Examples 1 to 4, and evaluation was made of the blankets of Examples 1 to 5 and Comparative Examples 1 to 4 as to the printing aptitudes and paper discharging properties. The following shows the printing test conditions and how to evaluate.

Printing Conditions

Printing Machine: RYOBI 560 manufactured by Ryobi Co., Ltd.

Printing Speed: 10,000 pieces/hour

Ink: MARK V NEW manufactured by Toyo Ink Co., Ltd.

Paper: YUTORIROCOAT 110 KG manufactured by Daio Seishi Co. , Ltd.

How to Evaluate Printing Aptitudes and Paper Discharging Properties (1) Dot Shape With the use of an image analyzing device (LA555 manufactured by Pierce Co., Ltd.), the dot shape was evaluated in terms of the shape coefficient of printed dots. The shape coefficient of dots is represented by the following equation. As the shape coefficient gets nearer to 1, the net point is advantageously approximated to a circle having perfect roundness. Shape Coefficient=(Peripheral Length)$^2 \div (4\pi \times$ area)

(2) Ink Applicability to a Solid Printing Portion

With the use of the image analyzing device above, a solid printing portion was checked for density distribution to obtain the standard deviation, by which the ink applicability to a solid printing portion was evaluated. That is, smaller the standard deviation is, the better the ink applicability to a solid printing portion.

(3) Slurs (Flow of Dot)

Slurs were evaluated based on the ratio in line width of transverse lines to longitudinal lines with the use of a slur gauge (manufactured by GATF Co., Ltd.). As the line width ratio gets nearer to 1, the blanket is ranked higher as to slurs.

(4) Paper Discharging Properties

There was measured the curl height of ten coated paper pieces, as overlapped, on which solid printing had been entirely carried out. As the curl height is lower, the blanket is ranked higher as to paper discharging properties.

Table 3 shows the results of the tests above.

TABLE 3

| | Paper Discharging Properties | Ink Applicability to Solid Printing Portion | Dot Configuration | Slur |
|---|---|---|---|---|
| Comparative Example 1 (Conventional Product A) | 37 | 10.0 | 1.3 | 1.06 |
| Comparative Example 2 | 42 | 10.2 | 1.1 | 1.08 |
| Example 1 | 30 | 9.9 | 1.3 | 1.05 |
| Example 2 | 24 | 9.8 | 1.3 | 1.04 |
| Example 3 | 13 | 9.7 | 1.3 | 1.04 |
| Example 4 | 9 | 9.4 | 1.3 | 1.04 |
| Example 5 | 5 | 10.5 | 1.5 | 1.03 |
| Comparative Example 3 | 6 | 10.7 | 1.5 | 1.03 |
| Comparative Example 4 | 4 | 12.7 | 2.4 | 1.05 |

As is apparent from Table 3, Comparative Example 1 (hereinafter referred to as conventional product A) is poor in paper discharging properties and slurs, but good in dot shape and ink applicability to a solid printing portion.

As compared with the conventional product A, Comparative Example 2 is improved in dot shape, but inferior in ink applicability to a solid printing portion, slurs and paper discharging properties.

As compared with the conventional product A, Comparative Example 3 is improved in dot shape, slurs and paper discharging properties, but inferior in ink applicability to a solid printing portion.

As compared with the conventional product A, Comparative Example 4 is greatly improved in paper discharging properties, but inferior in dot shape, ink applicability to a solid printing portion and slurs.

On the other hand, Examples 1 to 5 are greatly improved in paper discharging properties as compared with the conventional product A. Further Examples 1 to 5 are also improved in slurs and ink applicability to a solid printing portion. As to the dot shape, Examples 1 to 5 are as good as the conventional product A.

Particularly, when Example 3 is compared with the conventional product A, both blankets are similar to each other in 10-point mean roughness Rz, but greatly different from each other in paper discharging properties due to the difference in mean peak distance Sm.

Thus, the following will be understood from the results above. The surface configuration presenting a large mean peak distance Sm and a large 10-point mean roughness Rz is advantageous in view of paper discharging properties. It is possible to set the mean peak distance Sm in the range from about 25 μm to about 70 μm, and the 10-point mean roughness Rz in the range from about 4 μm to about 10 μm. In view of the balance with other printing aptitudes, however, it is preferable that the mean peak distance Sm is set in the range from about 35 μm to about 50 μm, and that the 10-point mean roughness Rz is from about 5 μm to about 8 μm.

The present invention may be embodied in other specific forms without departing from the spirit or essential characteristics thereof. The present embodiment is therefore to be considered in all respects as illustrative and not restrictive. For example, the description has been made of the embodiment in which the offset blanket includes a porous compressive layer disposed under the surface printing layer. However, similar effects can be produced when the present invention is applied to an offset blanket having no such a compressive layer. Thus, the scope of the present invention should be indicated by the appended claims rather than by the foregoing description. Further, all changes which come within the meaning and range of equivalency of the claims are therefore intended to be embraced therein.

What is claimed is:

1. An offset blanket comprising a supporting layer and a surface printing layer laminated on said supporting layer, wherein said surface printing layer has a surface configuration having a mean peak height Sm, represented by the following equation, $$S_m = \frac{S_1 + S_2 + \ldots + S_n}{n}$$

wherein $S_m$ is about 25 um to about 70 um and each of $S_1, S_2, \ldots S_n$ refers to the distance between a point where a section curve of said surface printing layer crosses an average line in a direction from one peak to a corresponding valley present in a measurement length and a point where said section curve crosses said average line in a direction from the next peak to its corresponding valley; and n refers to the number of peaks present in said measurement length.

2. An offset blanket according to claim 1, wherein the supporting layer has a compressive layer.

3. An offset blanket according to claim 1, wherein the surface printing layer has a surface configuration in which a 10-point mean roughness $R_z$, is represented by the following equation, $$R_z = \frac{1}{5}\left(\sum_{i=1}^{5} P_i - \sum_{i=1}^{5} V_i\right)$$

wherein $R_z$ is about 4 um to about 10 um and $P_i$ refers to the heights of the peaks from the highest one to the fifth highest one as measured in the depth magnification from the average line in a portion having a basic length extracted from the section curve; and $V_i$ refers to the depths of the valley bottoms from the deepest one to the fifth deepest one as measured from the average line.

* * * * *